United States Patent
Kato et al.

(10) Patent No.: US 12,514,466 B2
(45) Date of Patent: Jan. 6, 2026

(54) WALKING TRAINING SYSTEM, CONTROL METHOD THEREOF, AND CONTROL PROGRAM

(71) Applicant: TOYOTA JIDOSHA KABUSHIKI KAISHA, Toyota (JP)

(72) Inventors: Yoshiaki Kato, Miyoshi (JP); Takuma Nakamura, Nisshin (JP); Taiga Matsumoto, Nagoya (JP); Yo Sato, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 896 days.

(21) Appl. No.: 17/659,579

(22) Filed: Apr. 18, 2022

(65) Prior Publication Data

US 2022/0346668 A1    Nov. 3, 2022

(30) Foreign Application Priority Data

Apr. 28, 2021    (JP) .................. 2021-075758

(51) Int. Cl.
*A61B 5/103* (2006.01)
*A61B 5/00* (2006.01)
(Continued)

(52) U.S. Cl.
CPC .......... *A61B 5/1038* (2013.01); *A61B 5/0077* (2013.01); *A61B 5/4836* (2013.01);
(Continued)

(58) Field of Classification Search
CPC ............... A61B 5/1038; A61B 5/0077; A61B 5/4836; A61B 5/112; A61B 5/1122; A61H 1/0262
See application file for complete search history.

(56) References Cited

U.S. PATENT DOCUMENTS 3,894,437 A * 7/1975 Hagy .................. A61B 5/1038
600/592
2017/0027803 A1 2/2017 Agrawal et al.
(Continued)

FOREIGN PATENT DOCUMENTS

CN        101421008 A      4/2009
JP     2006204730 A *  8/2006
(Continued)

OTHER PUBLICATIONS

Machine Translation of KR-101373628-B1. Accessed on Mar. 2025 (Year: 2012).*
(Continued)

*Primary Examiner* — Kendra D Carter
*Assistant Examiner* — Jaeick Jang
(74) *Attorney, Agent, or Firm* — SoraIP, Inc.

(57) ABSTRACT

A walking training system according to an embodiment includes: a treadmill; a foot sole load detection unit configured to detect load received from foot soles of a trainee aboard a belt of the treadmill; a first photographing device configured to photograph the trainee from a lateral side; a skeletal information acquisition unit configured to acquire first skeletal information that is skeletal information on the trainee in a sagittal plane from an image photographed by the first photographing device; and a specification unit configured to specify respective pieces of skeletal information on a right leg and a left leg included in the first skeletal information acquired by the skeletal information acquisition unit, based on the load received from the foot soles of the trainee detected by the foot sole load detection unit.

6 Claims, 10 Drawing Sheets

(51) Int. Cl.
  *A61H 1/02* (2006.01)
  *A63B 22/02* (2006.01)
(52) U.S. Cl.
  CPC ........... *A61H 1/0262* (2013.01); *A63B 22/02* (2013.01); *A61B 2505/09* (2013.01)

(56) References Cited

U.S. PATENT DOCUMENTS

| | | | | |
|---|---|---|---|---|
| 2017/0087416 | A1* | 3/2017 | Hu | G16H 20/30 |
| 2017/0360333 | A1* | 12/2017 | Shideler | A61B 5/742 |
| 2018/0140496 | A1* | 5/2018 | Sankai | A63B 69/0064 |

FOREIGN PATENT DOCUMENTS

| | | | | |
|---|---|---|---|---|
| JP | 2009-542407 | A | | 12/2009 |
| JP | 2015107247 | A * | | 6/2015 |
| JP | 2016-140591 | A | | 8/2016 |
| JP | 2019118706 | A | | 7/2019 |
| JP | 2020-189073 | A | | 11/2020 |
| KR | 101373628 | B1 * | | 9/2012 |
| WO | 2008/007856 | A1 | | 1/2008 |
| WO | WO-2019240354 | A1 * | 12/2019 | ........... A61B 5/1038 |
| WO | WO-2021225249 | A1 * | 11/2021 | ........... A61B 5/0035 |

OTHER PUBLICATIONS

Machine Translation of WO-2019240354-A1. Accessed on Mar. 2025. (Year: 2019).*
Machine Translation of JP-2006204730-A. Accessed on Mar. 2025. (Year: 2006).*
Machine Translation of WO-2021225249-A1. Accessed on Mar. 2025 (Year: 2020).*

* cited by examiner

PHOTOGRAPHED IMAGE
(SAGITTAL PLANE)

SKELETAL INFORMATION
(SAGITTAL PLANE)

UNABLE TO SPECIFY SKELETAL
INFORMATION ON RIGHT LEG
AND LEFT LEG

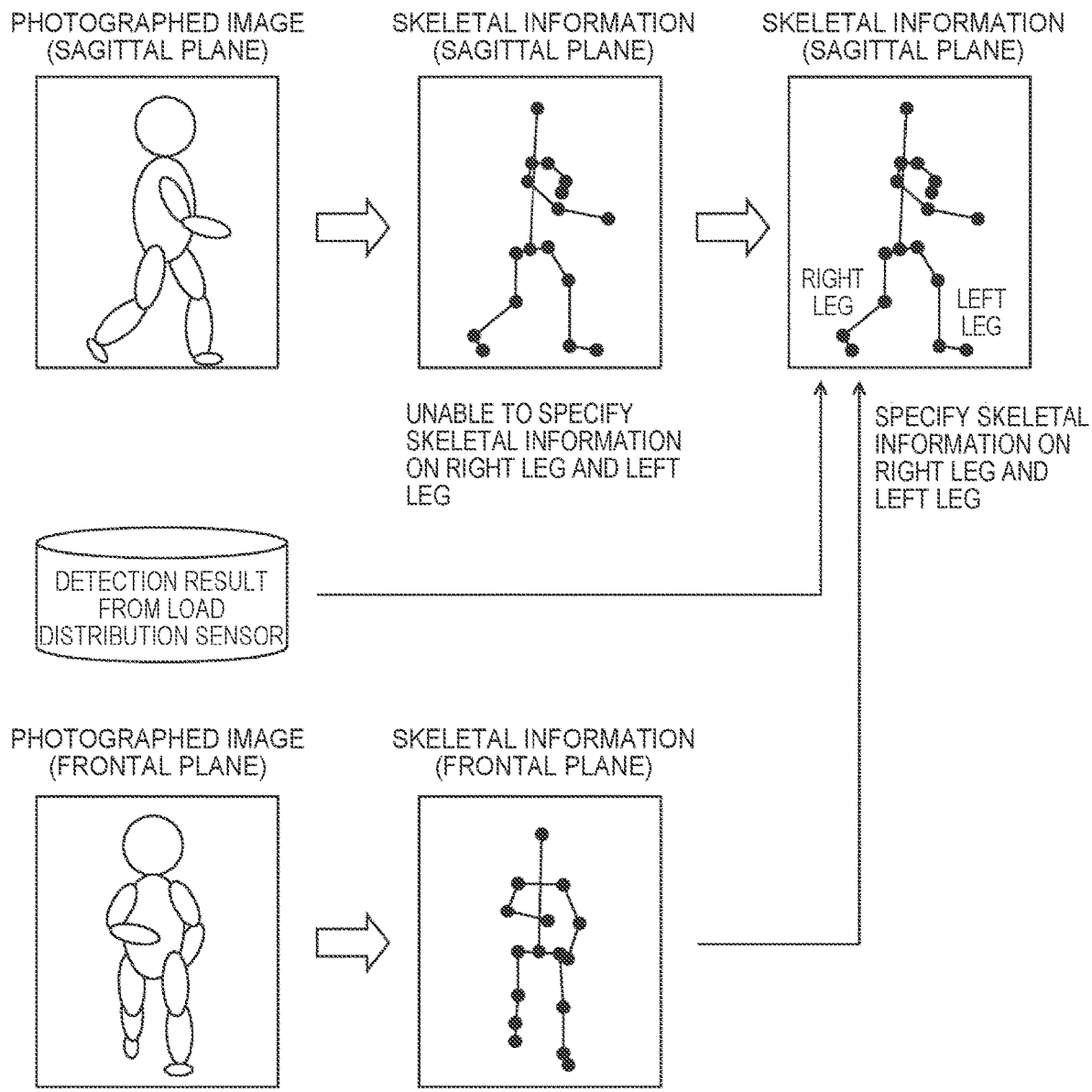

WALKING TRAINING SYSTEM, CONTROL METHOD THEREOF, AND CONTROL PROGRAM

CROSS-REFERENCE TO RELATED APPLICATION

This application claims priority to Japanese Patent Application No. 2021-075758 filed on Apr. 28, 2021, incorporated herein by reference in its entirety.

BACKGROUND

1. Technical Field

The disclosure relates to a walking training system, a control method thereof, and a control program.

2. Description of Related Art

Japanese Unexamined Patent Application Publication No. 2019-118706 discloses a walking training system that provides walking training of a paralyzed patient with a paralyzed leg. The walking training system includes an acquisition unit that acquires a motion amount associated with a walking motion of each step of a paralyzed body part including an affected leg that is a paralyzed leg, an evaluation unit that evaluates that the walking motion is abnormal walking when the motion amount acquired by the acquisition unit matches a predetermined abnormal walking criteria, and a calculation unit that calculates a training result for a series of walking training based on an integration number of the abnormal walking evaluated by the evaluation unit.

SUMMARY

In the related art, it is determined, for example, whether the leg of a trainee is in a standing state or a free leg state based on the result of detection by a load sensor. With only the result of detection by the load sensor, it is difficult to detect parameters, such as a bending degree of the leg of the trainee, and the position (height) of the leg in the free leg state. In short, the related art fails to acquire accurate gait information on the trainee. Therefore, the related art has a difficulty in providing effective walking training to the trainee.

The disclosure has been made under the above background, and an object of the disclosure is to provide a walking training system, a control method thereof, and a control program, capable of providing effective training to a trainee by acquiring accurate gait information on the trainee.

A walking training system according to one embodiment of the disclosure includes a treadmill, a foot sole load detection unit, a first photographing device, a skeletal information acquisition unit, and a specification unit. The foot sole load detection unit is configured to detect load received from foot soles of a trainee aboard a belt of the treadmill. The first photographing device is configured to photograph the trainee from a lateral side of the trainee. The skeletal information acquisition unit is configured to acquire first skeletal information that is skeletal information on the trainee in a sagittal plane from an image photographed by the first photographing device. The specification unit is configured to specify respective pieces of skeletal information on a right leg and a left leg included in the first skeletal information acquired by the skeletal information acquisition unit, based on the load received from the foot soles of the trainee detected by the foot sole load detection unit. The walking training system can specify the respective pieces of skeletal information on the right leg and the left leg included in the first skeletal information, based on the load received from the foot soles of the trainee detected by the foot sole load detection unit. Accordingly, accurate gait information on the trainee can be acquired, which makes it possible to provide effective walking training to the trainee.

The foot sole load detection unit may be a load distribution sensor that is installed under the belt of the treadmill so as not to be interlocked with the belt and configured to detect distribution of the load received from the foot soles of the trainee aboard the belt of the treadmill.

The walking training system may further include a second photographing device configured to photograph the trainee from a front side or a rear side of the trainee. The skeletal information acquisition unit may be configured to acquire the first skeletal information that is the skeletal information on the trainee in the sagittal plane from the image photographed by the first photographing device, and also configured to acquire second skeletal information that is skeletal information on the trainee in a frontal plane from an image photographed by the second photographing device. The specification unit may be configured to specify the respective pieces of skeletal information on the right leg and the left leg included in the first skeletal information acquired by the skeletal information acquisition unit, based on positions of the foot soles of the trainee detected by the load distribution sensor and the second skeletal information acquired by the skeletal information acquisition unit.

The specification unit may be configured to determine whether a foot sole of the trainee to be detected by the load distribution sensor corresponds to the right leg or the left leg, based on the position of the foot sole of the trainee to be detected by the load distribution sensor with a boundary line extending along an advancing direction of the trainee as a reference.

The load distribution sensor may include a first load sensor installed in a right area of the boundary line, and a second load sensor installed in a left area of the boundary line.

The specification unit may be configured to determine whether the foot sole of a trainee to be detected next by the load distribution sensor corresponds to the right leg or the left leg, based on the position of the foot sole of the trainee to be detected next by the load distribution sensor, with a boundary line as a reference, the boundary line passing through the center of a line segment that connects two foot sole positions of the trainee detected continuously by the load distribution sensor and extending along an advancing direction of the trainee.

The foot sole load detection unit may be a set of load sensors attached to the respective foot soles of the right leg and the left leg of the trainee.

A control method of a walking training system according to one embodiment of the disclosure includes the steps of: detecting load received from foot soles of a trainee aboard a belt of a treadmill by a foot sole load detection unit; photographing the trainee from a lateral side of the trainee by a first photographing device; acquiring first skeletal information that is skeletal information on the trainee in a sagittal plane from an image photographed by the first photographing device; and specifying respective pieces of skeletal information on a right leg and a left leg included in the first skeletal information, based on the load received from the foot soles of the trainee detected by the foot sole load detection unit. The control method of a walking training system can specify respective pieces of skeletal information on the right leg and the left leg included in the skeletal information of the trainee, based on the load received from the foot soles of the trainee detected by the foot sole load detection unit. Accordingly, accurate gait information on the trainee can be acquired, which makes it possible to provide effective walking training to the trainee.

A control program according to one aspect of the disclosure causes a computer to execute processing including: detecting load received from foot soles of a trainee aboard a belt of a treadmill by a foot sole load detection unit; photographing the trainee from a lateral side of the trainee by a first photographing device; acquiring first skeletal information that is skeletal information on the trainee in a sagittal plane from an image photographed by the first photographing device; and specifying respective pieces of skeletal information on a right leg and a left leg included in the first skeletal information, based on the load received from the foot soles of the trainee detected by the foot sole load detection unit. The control program can specify the respective pieces of skeletal information on the right leg and the left leg included in the skeletal information of the trainee, based on the load received from the foot soles of the trainee detected by the foot sole load detection unit. Accordingly, accurate gait information on the trainee can be acquired, which makes it possible to provide effective walking training to the trainee.

The disclosure can provide a walking training system, a control method thereof, and a control program, capable of providing effective training to a trainee by acquiring accurate gait information on the trainee.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 illustrates another example of the detection method of the gait state of the trainee by the walking training apparatus shown in FIG. 1.

DETAILED DESCRIPTION OF EMBODIMENTS

While the disclosure will be described hereinafter through an embodiment of the disclosure, the disclosure in the scope as set forth by the claims is not limited by the embodiment disclosed below. Moreover, not all the component members to be described in the embodiment are necessarily essential as means for accomplishing the object. For clear understanding, the following descriptions and drawings are omitted and simplified as appropriate. In each of the drawings, identical component members are designated by identical reference signs, and redundant description is omitted as necessary.

First Embodiment

Figure 1:
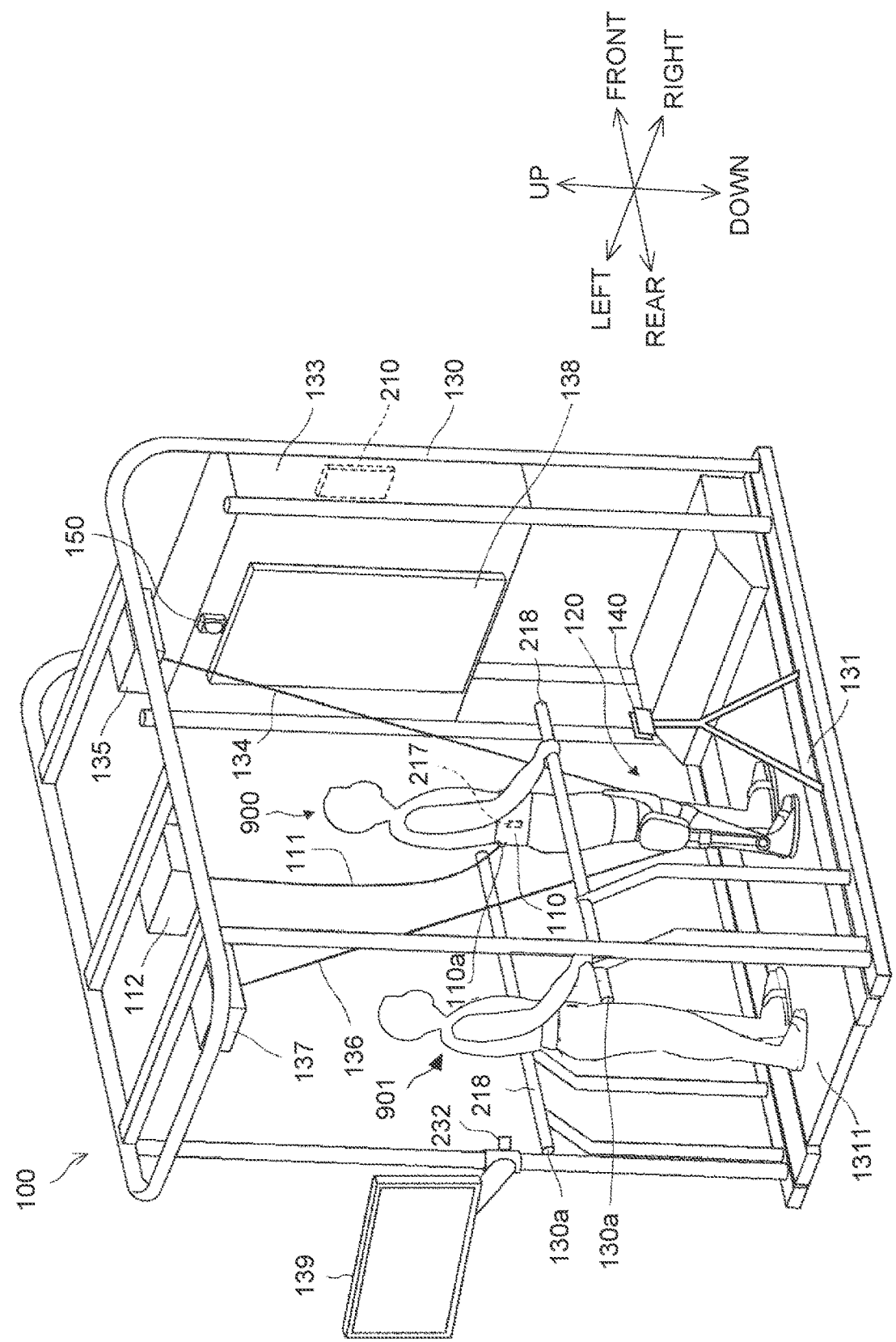
FIG. 1 is an overall concept diagram showing a configuration example of a walking training apparatus according to a first embodiment.

FIG. 1 is an overall concept diagram showing a configuration example of a walking training apparatus according to a first embodiment. A walking training apparatus 100 according to the embodiment is a specific example of a rehabilitation support apparatus that supports rehabilitation of a trainee (user) 900. More particularly, the walking training apparatus 100 is a specific example of the walking training apparatus that supports walking training. The walking training apparatus 100 is an apparatus for the trainee 900, who is a hemiplegic patient with paralysis on one leg, to conduct walking training as instructed by a training staff member 901. Here, the training staff member 901 may be, for example, a therapist (physical therapist) or a doctor, who may also be referred to as a trainer, a training aide, a training assistant, or the like, since the training staff member 901 assists the training of the trainee by providing instructions or aids. The walking training apparatus 100 can also be called a walking training system. In the following description, an up-down direction, a right-left direction, and a front-rear direction are based on the orientation of the trainee 900.

The walking training apparatus 100 mainly includes a control panel 133 attached to a frame 130 that constitutes an entire framework, a treadmill 131 for the trainee 900 to walk, and a walking assist device (robot leg) 120 mounted on an affected leg that is a paralyzed-side leg part of the trainee 900.

The treadmill 131 is an apparatus that promotes walking of the trainee 900. The trainee 900 who conducts walking training boards a belt 1311, and attempts to perform a walking motion as the belt 1311 moves. As shown in FIG. 1, the training staff member 901 can also perform a walking motion together with the trainee 900 by standing behind the trainee 900 on the belt 1311. However, it is preferable that the training staff member 901 be typically in the state of easily providing assistance to the trainee 900, such as in the state of standing across the belt 1311.

Figure 2:
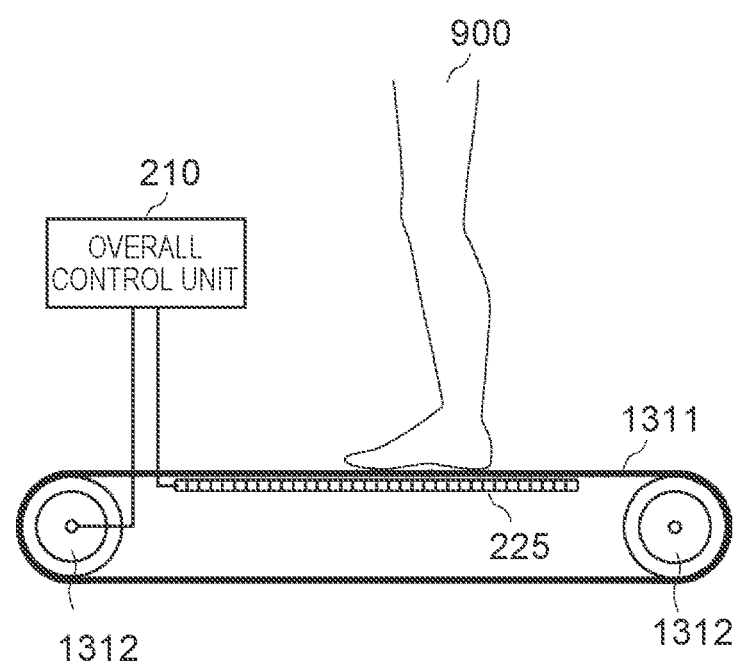
FIG. 2 is a schematic side view of a portion of a treadmill included in the walking training apparatus shown in FIG. 1.
Figure 2:
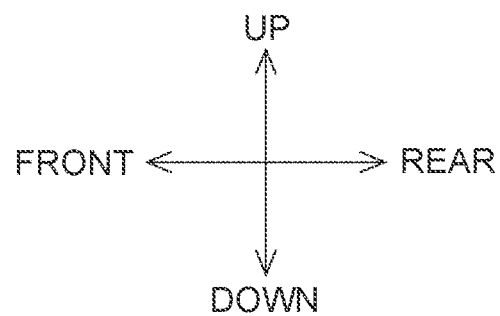

FIG. 2 is a schematic side view of a portion of the treadmill 131.

As shown in FIG. 2, the treadmill 131 includes at least the ring-shaped belt 1311, pulleys 1312, and a motor which is not illustrated. Inside the belt 1311 (under the surface of the belt 1311 where the trainee 900 is aboard), a load distribution sensor 225 is installed so as not to interlock with the belt 1311. However, the load distribution sensor 225 may be provided above the belt 1311 so as to interlock with the belt 1311. Note that the load distribution sensor 225 is an example of a foot sole load detection unit 224. Other examples of the foot sole load detection unit 224 will be described later.

The load distribution sensor 225 includes a plurality of sensors. The sensors are arranged in a matrix shape under the belt 1311 that supports the foot soles of the trainee 900. The load distribution sensor 225 can detect the magnitude and distribution of surface pressure (load) received from the foot soles of the trainee 900 by using the sensors. For example, the load distribution sensor 225 is a load detection sheet of a resistance change detection type, in which a plurality of electrodes are arranged in a matrix shape. The result of detection by the load distribution sensor 225 can be used to determine a walking state of the trainee 900 (whether each leg is in a standing state or a free leg state). The result of detection by the load distribution sensor 225 can also be used to detect a gait state of the trainee 900, such as a bending degree of each leg, and the position (height) of the leg in the free leg state, in addition to be used to determine whether each leg of the trainee 900 is in the standing state or in the free leg state. Details of a detection method of the gait state of the trainee 900 using the detection result of the load distribution sensor 225 will be described later.

In the treadmill 131, for example, an overall control unit 210 as will be described later determines a walking state of the trainee 900 based on the detection result of the load distribution sensor 225, and rotates (moves) the ring-shaped belt 1311 by rotating the pulleys 1312 with an unillustrated motor depending on the walking state. This enables the trainee 900 to conduct walking training without leaving the belt 1311.

The frame 130 is allowed to stand on the treadmill 131 that is installed on the floor. The frame 130 supports component members such as the control panel 133 that houses the overall control unit 210 that controls the motor and sensors, and a training monitor 138 that is a liquid crystal panel for presenting the progress of training, or the like, to the trainee 900. The frame 130 also supports a front tension unit 135 in a region in front of an overhead part of the trainee 900, a harness tension unit 112 in a region of the overhead part, and a rear tension unit 137 in a region behind the overhead part. The frame 130 also includes handrails 130a for the trainee 900 to grasp.

The handrails 130a are located on both the left and right sides of the trainee 900. The handrails 130a are each arranged in a direction parallel to the walking direction of the trainee 900. The position of the handrails 130a can be adjusted in an up-down direction and a right-left direction. In other words, the handrails 130a may include a mechanism to change their height and width. In addition, the handrails 130a may be configured such that the height of the handrails 130a on the front side in the walking direction can be adjusted to be different from the height on the rear side, for example, to allow their inclination angles to be changed. For example, the handrails 130a may have an inclination angle that gradually increases along the walking direction.

The handrails 130a are each equipped with a handrail sensor 218 that detects the load received from the trainee 900. For example, the handrail sensor 218 may be a load detection sheet of a resistance change detection type, in which a plurality of electrodes are arranged in a matrix shape. The handrail sensor 218 may be a six-axis sensor formed by combining a three-axis acceleration sensor (x,y,z) and a three-axis gyro sensor (roll, pitch, yaw). Note that the type or installation position of the handrail sensor 218 is not particularly limited.

Cameras 140, 150 serve as imaging units for full-body observation of the trainee 900. The camera 140 (first photographing device) is installed to allow the trainee 900 to be photographed from a lateral side of the trainee 900. The camera 150 (second photographing device) is installed to allow the trainee 900 to be photographed from the front side (or the rear side) of the trainee 900. For example, the camera 150 is installed in the vicinity of the training monitor 138 so as to face the trainee. The cameras 140, 150 take still images or video images of the trainee 900 during training. The cameras 140, 150 include a set of lenses and image elements that provide a viewing angle that is large enough to capture the entire body of the trainee 900. For example, the image element is a complementary metal oxide semiconductor (CMOS) image sensor that converts optical images that are imaged on an image formation surface into image signals.

Coordinated behaviors of the front tension unit 135 and the rear tension unit 137 offset the load of the walking assist device 120 so as to prevent the load from being a burden to the affected leg, and to further assist swinging movement of the affected leg according to the level of setting.

A front wire 134 has one end coupled to a winding mechanism of the front tension unit 135 and the other end coupled to the walking assist device 120. The winding mechanism of the front tension unit 135 winds or unwinds the front wire 134 in accordance with the movement of the affected leg through turning on and off of the motor which is not illustrated. Similarly, a rear wire 136 has one end coupled to a winding mechanism of the rear tension unit 137 and the other end coupled to the walking assist device 120. The winding mechanism of the rear tension unit 137 winds or unwinds the rear wire 136 in accordance with the movement of the affected leg through turning on and off of the motor which is not illustrated. Coordinated behaviors of the front tension unit 135 and the rear tension unit 137 offset the load of the walking assist device 120 so as to prevent the load from being a burden to the affected leg, and to further assist the swinging movement of the affected leg according to the level of setting.

For example, the training staff member 901, as an operator, sets an assist level to be higher for the trainee with severe paralysis. As the assist level is set to be higher, the front tension unit 135 unwinds the front wire 134 with a relatively large force in accordance with the timing of the swinging movement of the affected leg. When the training is advanced and assistance is no longer required, the training staff member 901 sets the assist level to a minimum. When the assist level is set to the minimum, the front tension unit 135 unwinds the front wire 134 with a force large enough to cancel the self-weight of the walking assist device 120 in accordance with the timing of the swinging movement of the affected leg.

The walking training apparatus 100 further includes a fall prevention harness device constituted of an orthosis 110, a harness wire 111, and a harness tension unit 112.

The orthosis 110 is a belt wrapped around an abdominal region of the trainee 900. For example, the orthosis 110 is fixed to the abdominal region with a hook-and-loop fastener. The orthosis 110 includes a coupling hook 110a coupled to one end of the harness wire 111 that is a hanging tool. The orthosis 110 may also be referred to as a hanger belt. The trainee 900 wears the orthosis 110 such that the coupling hook 110a is positioned on a back part of the trainee 900.

The harness wire 111 has one end coupled to the coupling hook 110a of the orthosis 110 and the other end coupled to a winding mechanism of the harness tension unit 112. The winding mechanism of the harness tension unit 112 winds or unwinds the harness wire 111 through turning on and off of the motor which is not illustrated. With such configuration, when the trainee 900 is about to fall, the fall prevention harness device winds the harness wire 111 in accordance with an instruction from the overall control unit 210 that has detected the fall motion, and supports an upper body of the trainee 900 with the orthosis 110 to prevent fall of the trainee 900.

The orthosis 110 includes an attitude sensor 217 to detect the attitude of the trainee 900. The attitude sensor 217 is a combination of a gyro sensor and an acceleration sensor, for example. The attitude sensor 217 outputs an inclination angle in relation to the gravity direction of the abdominal region mounted with the orthosis 110.

An administrative monitor 139 is a display input device used by the training staff member 901 to monitor and operate. The administrative monitor 139 is attached to the frame 130. For example, the administrative monitor 139 is a liquid crystal panel with a touch panel provided on its surface. The administrative monitor 139 displays various menu items related to training settings, various parameter values used in training, training results, and the like. In the vicinity of the administrative monitor 139, an emergency stop button 232 is provided. When the training staff member 901 presses the emergency stop button 232, an emergency stop of the walking training apparatus 100 is performed.

The walking assist device 120 is mounted on the affected leg of the trainee 900 to assist walking of the trainee 900 by reducing the load of extension and bending in a knee joint of the affected leg. The walking assist device 120 transmits data on the operation of legs obtained by walking training to the overall control unit 210, or drives the joint part in accordance with an instruction from the overall control unit 210. The walking assist device 120 can also be connected, via a wire or the like, to a hip joint (joint member having a rotary portion) attached to the orthosis 110 which is part of the fall prevention harness device.

Details of Walking Assist Device 120

Figure 3:
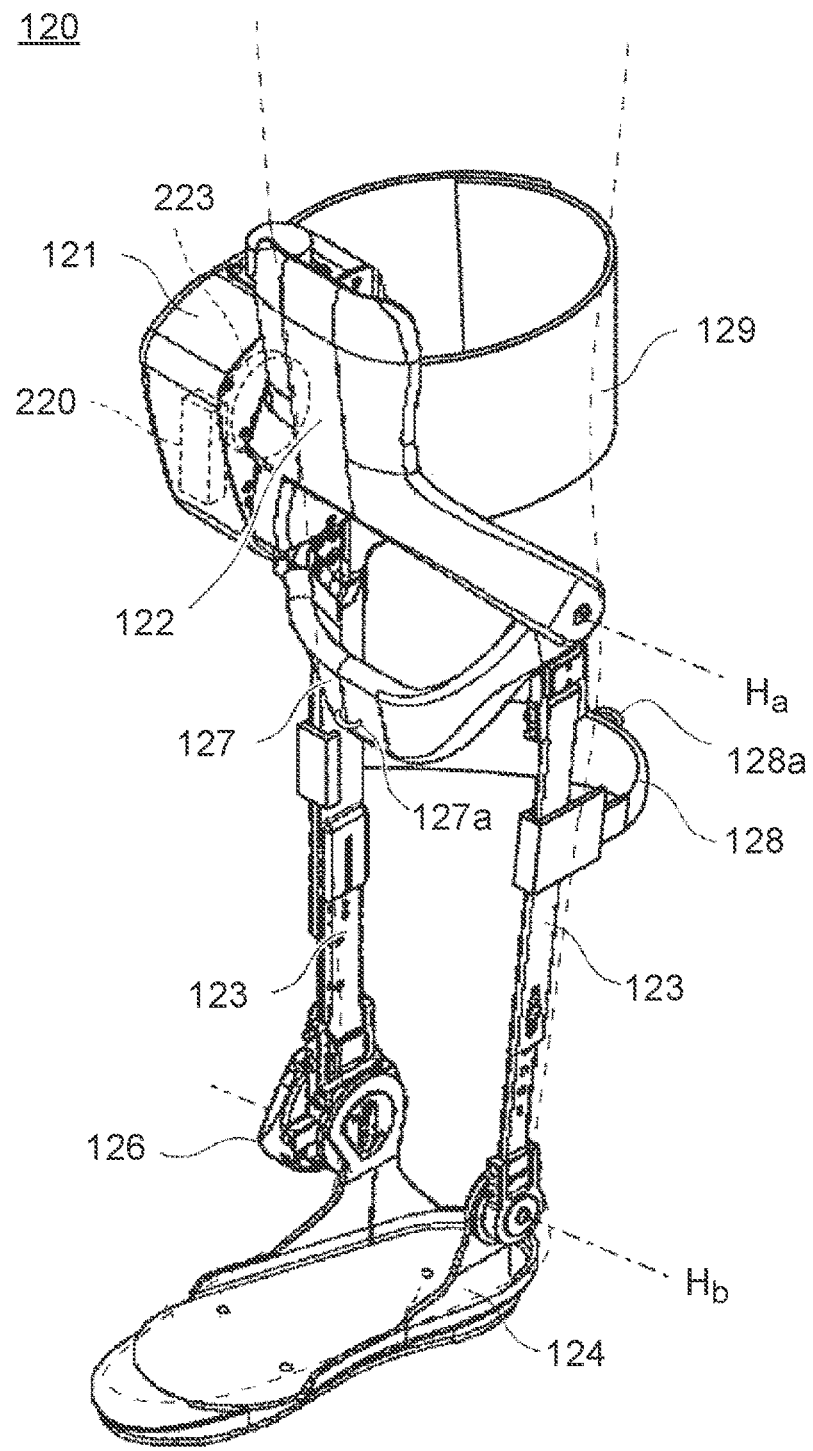
FIG. 3 is a schematic perspective view showing a configuration example of a walking assist device included in the walking training apparatus shown in FIG. 1.

FIG. 3 is a schematic perspective view showing a configuration example of the walking assist device 120. The walking assist device 120 mainly includes a control unit 121 and a plurality of frames that support each part of the affected leg. The walking assist device 120 is also referred to as a robot leg.

The control unit 121 includes an assist control unit 220 that controls the walking assist device 120, and also includes an unillustrated motor that generates driving force to assist extending movement and bending movement of the knee joint. The frames that support each part of the affected leg include an upper thigh frame 122, and lower thigh frames 123 that are pivotably connected to the upper thigh frame 122. The frames also include a foot flat frame 124 pivotably coupled to the lower thigh frames 123, a front coupling frame 127 for coupling the front wire 134, and a rear coupling frame 128 for coupling the rear wire 136.

The upper thigh frame 122 and the lower thigh frames 123 relatively pivot around an illustrated hinge shaft Ha. A motor of the control unit 121 rotates in accordance with an instruction from the assist control unit 220 to apply pressure so as to relatively open or close between the upper thigh frame 122 and the lower thigh frames 123 along the hinge shaft Ha. An angle sensor 223 that is housed in the control unit 121 is, for example, a rotary encoder to detect an angle between the upper thigh frame 122 and the lower thigh frames 123 around the hinge shaft Ha. The lower thigh frames 123 and the foot flat frame 124 relatively pivot around an illustrated hinge shaft Hb. An angle range of relative pivoting is pre-adjusted by an adjustment mechanism 126.

The front coupling frame 127 is provided to extend in the right-left direction on the front side of the upper thigh and to connect to the upper thigh frame 122 at both ends. The front coupling frame 127 also has a coupling hook 127*a* provided in the vicinity of the center in the right-left direction to couple the front wire 134. The rear coupling frame 128 is provided to extend in the right-left direction on the rear side of the lower thigh and to connect to the lower thigh frames 123 at both ends. The rear coupling frame 128 also has a coupling hook 128*a* provided in the vicinity of the center in the right-left direction to couple the rear wire 136.

The upper thigh frame 122 includes an upper thigh belt 129. The upper thigh belt 129 is a belt integrally provided in the upper thigh frame. The upper thigh belt 129 is wrapped around an upper thigh part of the affected leg to fix the upper thigh frame 122 to the upper thigh part. This prevents the entire walking assist device 120 from being shifted from the leg part of the trainee 900.

System Configuration Example of Walking Training Apparatus 100

Figure 4:
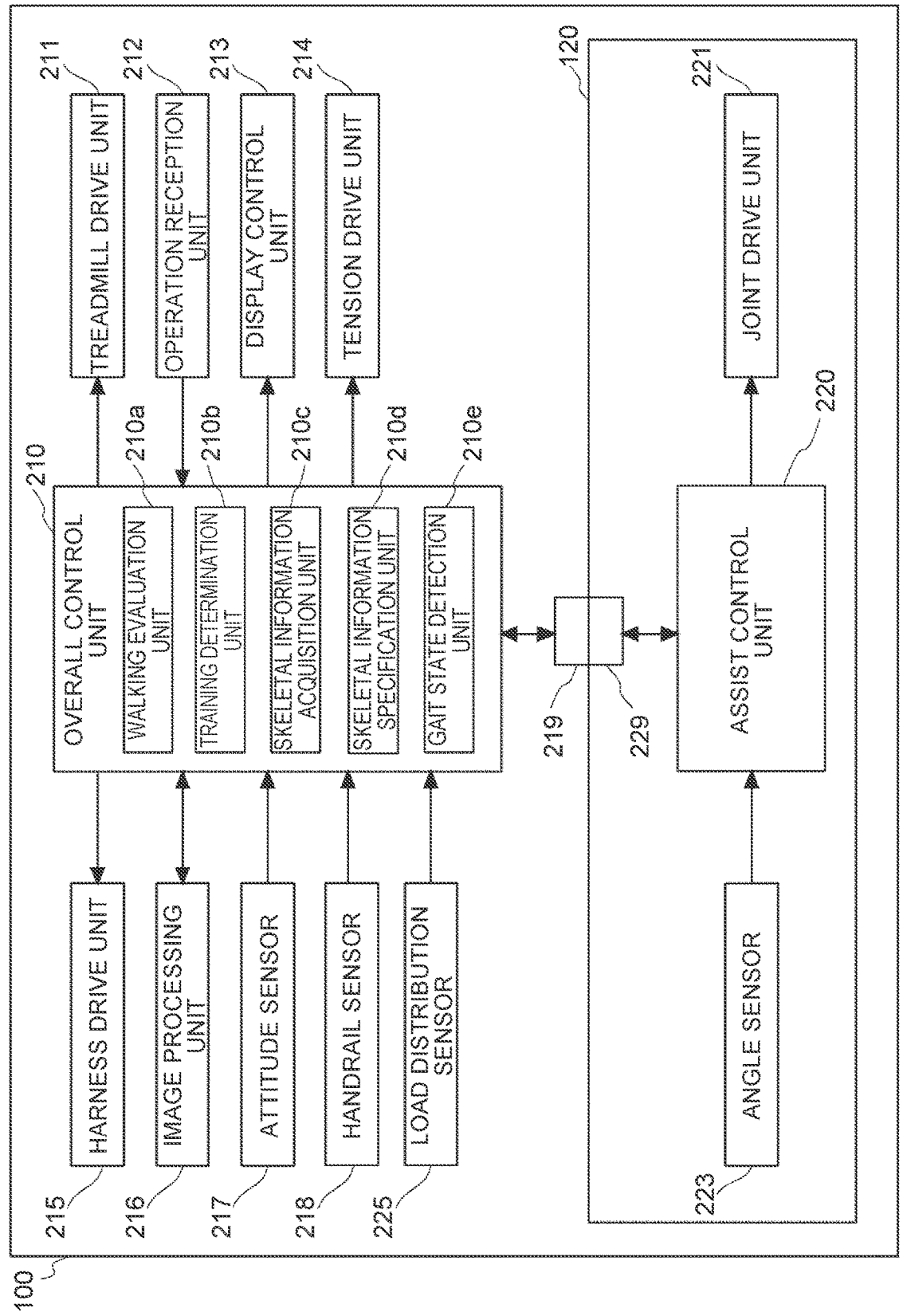
FIG. 4 is a block diagram showing a system configuration example of the walking training apparatus shown in FIG. 1.

With reference to FIG. 4, a system configuration example of the walking training apparatus 100 will be described below. FIG. 4 is a block diagram showing a system configuration example of the walking training apparatus 100.

As shown in FIG. 4, the system configuration of the walking training apparatus 100 includes the overall control unit 210, a treadmill drive unit 211, an operation reception unit 212, a display control unit 213, a harness drive unit 215, an image processing unit 216, the attitude sensor 217, the handrail sensors 218, the load distribution sensor 225 as an example of the foot sole load detection unit 224, a communication connection interface (IF) 219, and the walking assist device 120.

For example, the overall control unit 210 is a micro processing unit (MPU) that performs control of the entire apparatus by executing a control program read from a system memory.

The treadmill drive unit 211 includes a motor and a drive circuit that rotate the belt 1311 of the treadmill 131. The overall control unit 210 performs rotation control of the belt 1311 by sending a drive signal to the treadmill drive unit 211. For example, the overall control unit 210 adjusts the rotation speed of the belt 1311 in accordance with the walking speed set by the training staff member 901. Alternatively, the overall control unit 210 adjusts the rotation speed of the belt 1311 in accordance with the walking state of the trainee 900 determined based on the result of detection by the load distribution sensor 225.

The operation reception unit 212 accepts input operation by the training staff member 901 via operation buttons provided on the apparatus, a touch panel superimposed on the administrative monitor 139, an accessory remote control, or the like. An operation signal accepted by the operation reception unit 212 is transmitted to the overall control unit 210. The overall control unit 210 can provide an instruction to switch on and off of an electric power source, or an instruction to start training, based on the operating signal accepted by the operation reception unit 212. The overall control unit 210 can also input numerical values related to settings, and select menu items. The operation reception unit 212 can also naturally accept input operation by the trainee 900 in addition to the input operation by the training staff member 901.

The display control unit 213 receives a display signal from the overall control unit 210 to generate a display image, and displays the generated image on the training monitor 138 or the administrative monitor 139. The display control unit 213 generates an image indicating the progress of the training and real-time images photographed by the cameras 140, 150 based on the di splay signals.

A tension drive unit 214 includes a motor and a drive circuit for pulling the front wire 134 provided in the front tension unit 135, and a motor and a drive circuit for pulling the rear wire 136 provided in the rear tension unit 137. The overall control unit 210 controls winding of the front wire 134 and winding of the rear wire 136 by sending drive signals to the tension drive unit 214. The overall control unit 210 controls the tensile force of each wire by controlling the drive torque of the motor, in addition to the winding operation. Furthermore, the overall control unit 210 identifies the timing when the affected leg is switched from the standing state to the free leg state based on the detection result of the load distribution sensor 225, for example. In synchronization with the timing, the overall control unit 210 assists the swinging movement of the affected leg by increasing or decreasing the tensile force of each wire.

The harness drive unit 215 includes a motor and a drive circuit for pulling the harness wire 111 provided in the harness tension unit 112. The overall control unit 210 controls winding of the harness wire 111 and the tensile force of the harness wire 111 by sending drive signals to the harness drive unit 215. For example, when the overall control unit 210 predicts fall of the trainee 900, the overall control unit 210 winds a certain amount of the harness wire 111 to prevent the trainee from falling.

The image processing unit 216 is connected to the cameras 140, 150 and can receive image signals from the cameras 140, 150. The image processing unit 216 receives image signals from the cameras 140, 150, and performs image processing of the received image signals to generate image data in accordance with an instruction from the overall control unit 210. The image processing unit 216 may also perform image processing of the image signals received from the cameras 140, 150, and execute specific image analysis in accordance with an instruction from the overall control unit 210. For example, the image processing unit 216 uses image analysis to detect the position (standing position) of the foot of the affected leg in contact with the treadmill 131. Specifically, the standing position is computed by, for example, extracting an image area in the vicinity of the tip of the foot flat frame 124, and analyzing an identification marker drawn on a portion of the belt 1311 that overlaps the tip portion.

The attitude sensor 217 detects an inclination angle of the abdominal region of the trainee 900 in relation to the gravity direction as described above, and transmits the detection signal to the overall control unit 210. The overall control unit 210 computes the attitude of the trainee 900, that is, an inclination angle of a body trunk to be specific, by using the detection signal from the attitude sensor 217. The overall control unit 210 and the attitude sensor 217 may be connected through a wired line or connected through short-range wireless communication.

The handrail sensors 218 detect the load applied to the handrails 130a. Specifically, the load corresponding to a portion of the weight of the trainee 900 that cannot be supported by both the legs of the trainee 900 is added to the handrails 130a. The handrail sensors 218 detect the load, and transmits a detection signal to the overall control unit 210.

The load distribution sensor 225 detects the magnitude and distribution of surface pressure (load) received from the foot soles of the trainee 900 as described above, and transmits detection signals to the overall control unit 210. The overall control unit 210 receives and analyzes the detection signals to determine a walking state or to estimate switching.

The overall control unit 210 also plays a role as a function execution unit that executes various computations related to control, and executes the control. For example, the overall control unit 210 includes a walking evaluation unit 210a, a training determination unit 210b, a skeletal information acquisition unit 210c, a skeletal information specification unit 210d, and a gait state detection unit 210e. The skeletal information acquisition unit 210c, the skeletal information specification unit 210d, and the gait state detection unit 210e will be described later.

The walking evaluation unit 210a uses data acquired from various sensors to evaluate whether the walking motion of the trainee 900 is abnormal or not. For example, the training determination unit 210b determines the result of a series of walking training based on an integration number of abnormal walking evaluated by the walking evaluation unit 210a.

A determination method of the training result and a determination criteria may optionally be set.

For example, the result of training may be determined by comparing the amount of motion of a paralytic body part with the criteria for each walking phase. Here, the walking phase is obtained by classifying one walking period (one walking cycle) related to the affected leg (or the healthy leg) into stages, such as a standing stage where the affected leg is in the standing state, a transit stage from the standing stage to a free leg stage where the affected leg is in the free leg state, the free leg stage, and a transit stage from the free leg stage to the standing stage. A walking can be classified (determined) into any one of the walking phases based on the detection result by the load distribution sensor 225, for example. One walking cycle may include, as described above, the standing stage, the transit stage, the free leg stage, and the transit stage. However, which stage corresponds to a start stage is not particularly defined. Alternatively, one walking cycle may include, for example, a both-leg support state, a single-leg (affected leg) support state, the both-leg support state, and a single-leg (healthy leg) support state. In this case, the start stage is also not particularly defined.

The walking cycle focusing on the right leg or the left leg (healthy leg or affected leg) can be further subdivided. For example, the standing stage can be expressed in subdivisions including an initial grounding timing and four standing stages, and the free leg stage can be expressed in subdivisions including three free leg stages. The initial grounding timing indicates the moment when an observation foot part is grounded to the floor. The four standing stages indicate a load response stage, a standing middle stage, a standing end stage, and a pre-free leg stage. The load response stage is a period from the initial grounding to the moment when the foot part on the opposite side takes off from the floor (opposite side take-off). The standing middle stage is a period from the opposite side take-off to the moment when the heel of the observation foot part takes off (heel take-off). The standing end stage is a period from the heel take-off to the initial grounding on the opposite side. The pre-free leg stage is a period from the initial grounding on the opposite side to the moment when the observation foot part takes off from the floor (take-off). The three free leg stages indicate a free leg initial stage, a free leg middle stage, and a free leg end stage. The free leg initial stage is a period from the end of the pre-free leg stage (the take-off) until both the feet cross each other (foot part crossing). The free leg middle stage is a period from the foot part crossing until a shin bone becomes vertical (vertical shin bone). The free leg end stage is a period from the vertical shin bone to the initial grounding.

The communication connection IF 219 is an interface connected to the overall control unit 210. The communication connection IF 219 provides a command to the walking assist device 120 mounted on the affected leg of the trainee 900 and receives sensor information.

The walking assist device 120 may include a communication connection IF 229 that is connected with the communication connection IF 219 in a wired or wireless manner. The communication connection IF 229 is connected to the assist control unit 220 in the walking assist device 120. The communication connection IFs 219, 229 are communication interfaces, such as wired or wireless LAN, in conformity with communication standards.

The walking assist device 120 may also include the assist control unit 220, a joint drive unit 221, and the angle sensor 223. The assist control unit 220 is, for example, an MPU that controls the walking assist device 120 by executing a control program given by the overall control unit 210. The assist control unit 220 also informs the state of the walking assist device 120 to the overall control unit 210 via the communication connection IFs 219, 229. The assist control unit 220 also executes control such as start and stop of the walking assist device 120, upon reception of the command from the overall control unit 210.

The joint drive unit 221 includes a motor and a drive circuit of the control unit 121. The assist control unit 220 sends a drive signal to the joint drive unit 221 so as to apply pressure to relatively open or close between the upper thigh frame 122 and the lower thigh frames 123 along the hinge shaft Ha. Such operation assists extending motion or bending motion of the knee, and prevents a knee fracture.

The angle sensor 223 detects an angle between the upper thigh frame 122 and the lower thigh frames 123 along the hinge shaft Ha as described above, and transmits the detection signal to the assist control unit 220. The assist control unit 220 receives the detection signal, and computes an opening angle of the knee joint.

In order to provide effective training to the trainee 900, the walking training apparatus 100 is required to determine whether each leg of the trainee 900 is in the free leg state or the standing state, and is also required to accurately detect the bending degree of each leg of the trainee 900 and the position (height) of the leg in the free leg state. In short, the walking training apparatus 100 is required to accurately detect the gait state of the trainee 900 (i.e., to accurately acquire gait information on the trainee 900).

Figure 5:
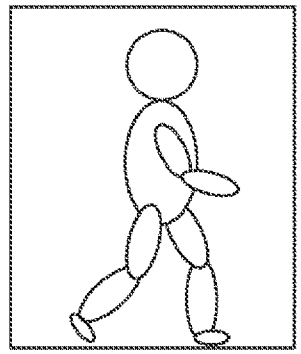
FIG. 5 illustrates an issue in the case of detecting a gait state of a trainee by using only the skeletal information on the trainee that is extracted from an image photographed by a photographing device.
Figure 5:
Figure 5:
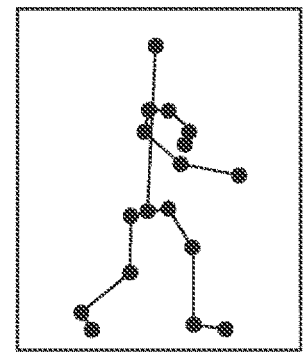

Here, the gait state of the trainee 900 is detected by referring to skeletal information on the trainee 900 in a sagittal plane that is extracted from an image photographed by the camera 140 that photographs the trainee 900 from the lateral side (i.e., skeletal information on the trainee 900 when the trainee 900 is viewed in the sagittal plane) as shown in FIG. 5. The skeletal information is constituted of points representing respective parts of the trainee and line segments connecting the points.

However, as shown in FIG. 5, it is difficult to specify the respective pieces of skeletal information corresponding to the right leg and the left leg of the trainee 900 from the skeletal information on the trainee 900 extracted from the image photographed by the camera 140. Therefore, it is difficult to accurately detect the gait state of the trainee 900 with only the skeletal information extracted from the image photographed by the camera 140. Without accurate detection of the gait state of the trainee 900, the trainee 900 is unable to conduct effective walking training.

Accordingly, in the present embodiment, the skeletal information specification unit 210*d* specifies the respective pieces of skeletal information corresponding to the right leg and the left leg of the trainee 900, out of the skeletal information on the trainee 900 acquired by the skeletal information acquisition unit 210*c*, based on the detection result of the foot sole load detection unit 224 (load distribution sensor 225 in the embodiment). Thus, in the present embodiment, the gait state detection unit 210*e* detects the gait state of the trainee 900 using the skeletal information on the trainee 900 with enhanced accuracy.

Figure 6:
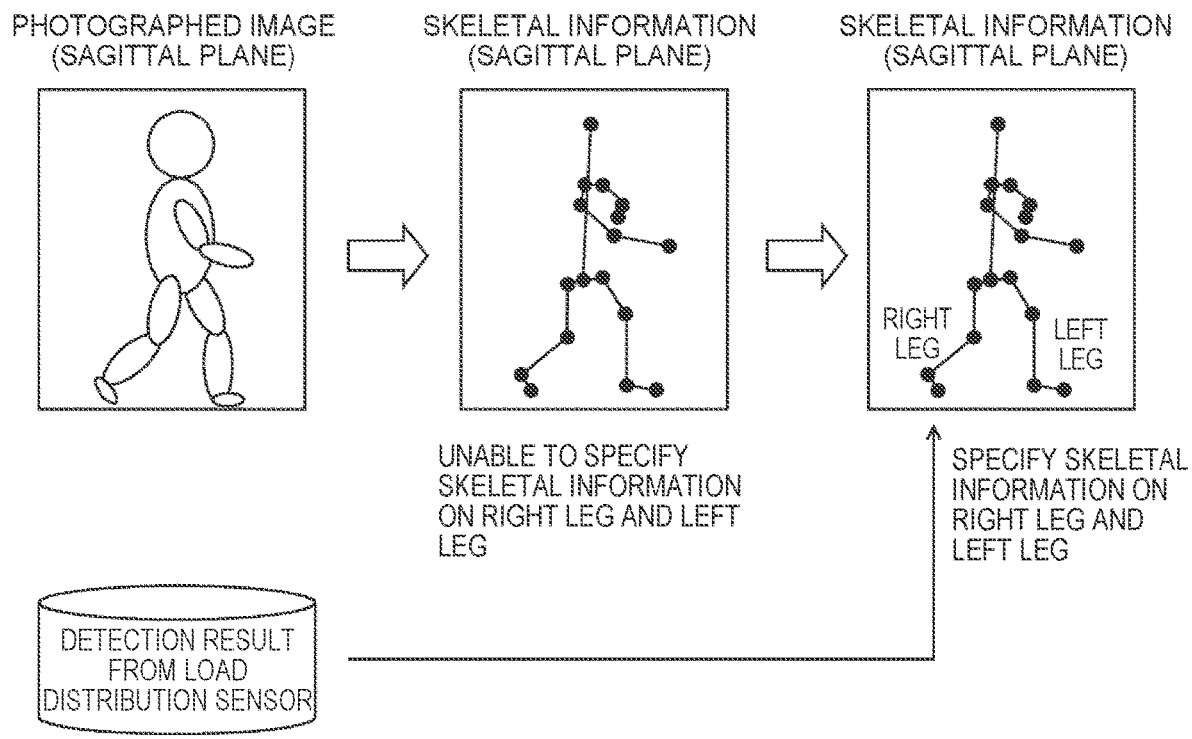
FIG. 6 illustrates an example of a detection method of the gait state of the trainee by the walking training apparatus shown in FIG. 1.

FIG. 6 illustrates an example of a detection method of the gait state of the trainee 900 by the walking training apparatus 100. As shown in FIG. 6, the skeletal information acquisition unit 210*c* first acquires the skeletal information on the trainee 900 in the sagittal plane (skeletal information on the trainee 900 when the trainee 900 is viewed in the sagittal plane) from the image photographed by the camera 140 that photographs the trainee 900 from the lateral side. The skeletal information specification unit 210*d* then specifies respective pieces of skeletal information on the right leg and the left leg included in the skeletal information on the trainee 900 in the sagittal plane acquired by the skeletal information acquisition unit 210*c*, based on the load received from the foot soles of the trainee 900 detected by the foot sole load detection unit 224. Then, the gait state detection unit 210*e* detects the gait state of the trainee 900 with use of the skeletal information in which the right leg and the left leg are specified. As a result, the accuracy of detecting the gait state of the trainee 900 is enhanced.

Example of Detection Method of Gait State of Trainee 900

Figure 7:
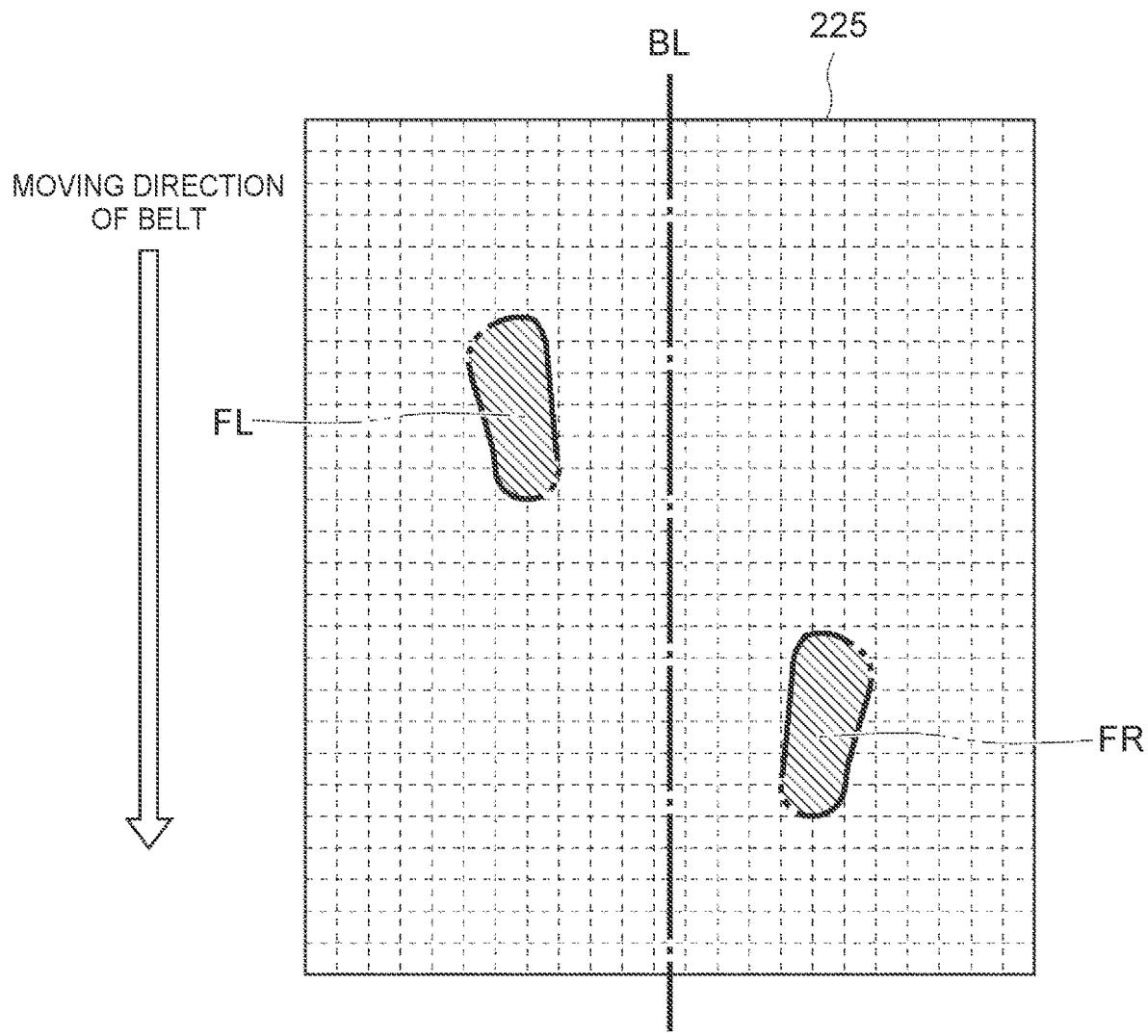
FIG. 7 is a schematic plan view showing an example of a foot sole load detection unit included in the walking training apparatus shown in FIG. 1.
Figure 7:
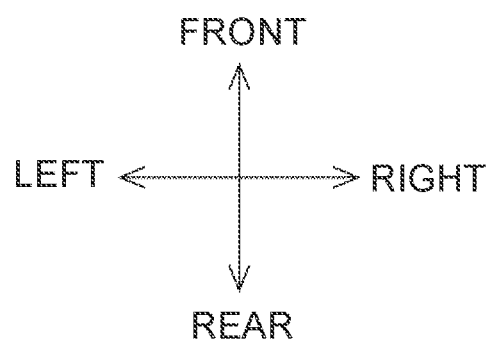

FIG. 7 is a schematic plan view showing an example of the foot sole load detection unit 224 used for detecting the gait state of the trainee 900.

In the example of FIG. 7, the load distribution sensor 225 is used as the foot sole load detection unit 224. As described before, the load distribution sensor 225 is installed inside the belt 1311 of the treadmill 131 (under the surface of the belt 1311 where the trainee 900 is aboard) so as not to interlock with the belt 1311. However, the load distribution sensor 225 may be provided above the belt 1311 so as to interlock with the belt 1311.

Here, the load distribution sensor 225 has a boundary line BL defined to pass through the center of a rectangular load detection area and extend along an advancing direction of the trainee 900 (in other words, the moving direction of the belt 1311). The load of the foot sole, detected in the area that is on the left side of the boundary line BL in the load detection area of the load distribution sensor 225, can be determined to be the load received from the foot sole of the left leg of the trainee 900. The load of the foot sole detected in the area that is on the right side of the boundary line BL can be determined to be the load received from the foot sole of the right leg of the trainee 900.

Hence, based on the position of a foot sole FL detected as the foot sole of the left leg in the area on the left side of the boundary line BL and the position of a foot sole FR detected as the foot sole of the right leg in the area on the right side of the boundary line BL in the load detection area of the load distribution sensor 225, the skeletal information specification unit 210d specifies the respective pieces of skeletal information on the right leg and the left leg included in the skeletal information on the trainee 900 in the sagittal plane acquired by the skeletal information acquisition unit 210c.

In the example of FIG. 7, the foot sole FL detected as the foot sole of the left leg in the area on the left side of the boundary line BL in the load detection area of the load distribution sensor 225 is located ahead of the trainee 900 in the advancing direction, and the foot sole FR detected as the foot sole of the right leg in the area on the right side of the boundary line BL is located behind the trainee 900 in the advancing direction. Accordingly, the skeletal information specification unit 210d can specify, out of the skeletal information shown in FIG. 6 for example, the skeletal information on a leg part located ahead (on the right side of the page) as the skeletal information on the left leg, and specify the skeletal information on a leg part located behind (on the left side of the page) as the skeletal information on the right leg. The gait state detection unit 210e detects the gait state of the trainee 900 with use of the skeletal information in which the right leg and the left leg are specified. As a result, the accuracy of detecting the gait state of the trainee 900 is enhanced.

Another Example of Detection Method of Gait State of Trainee 900

Figure 8:
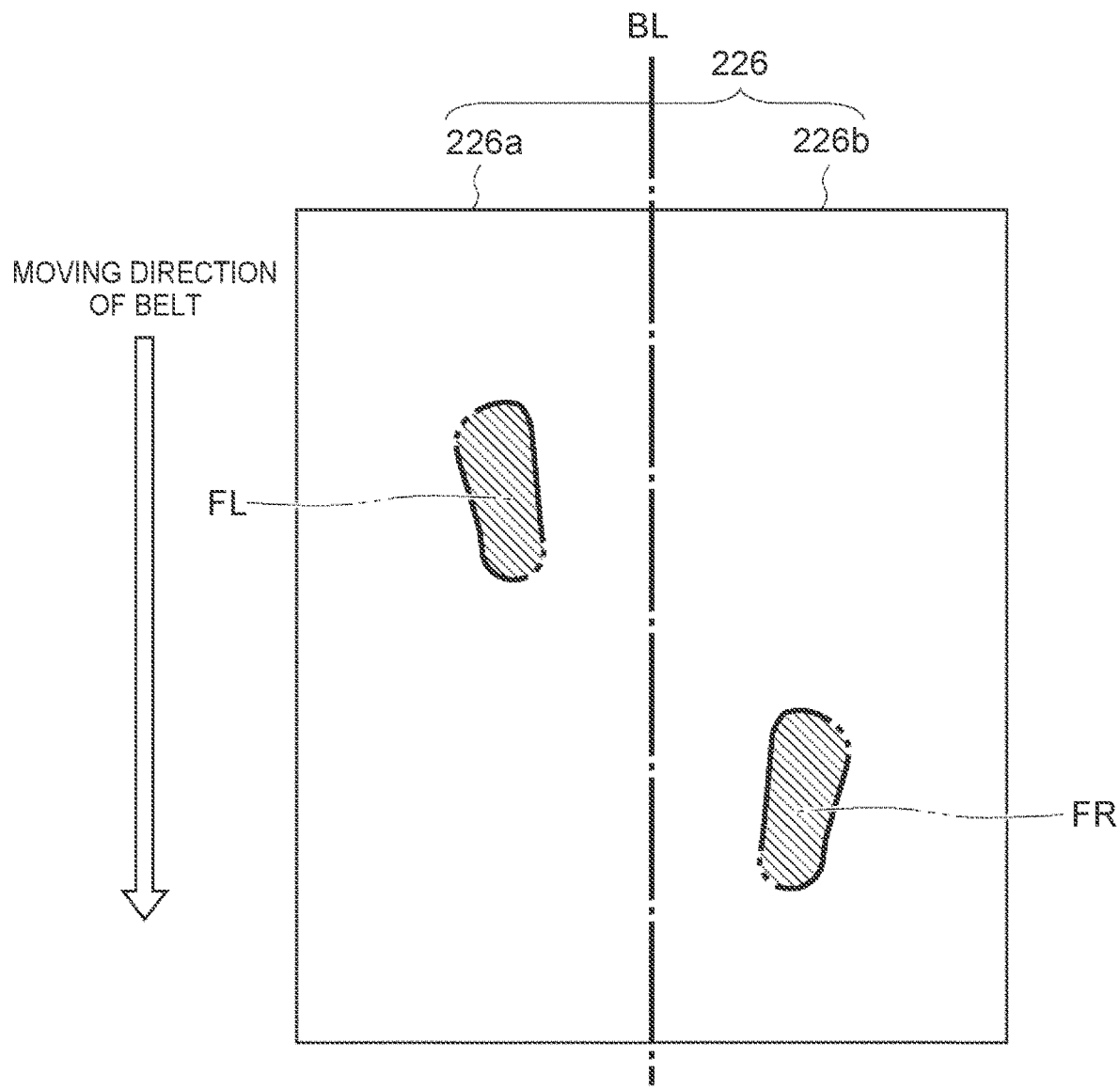
FIG. 8 is a schematic plan view showing another example of the foot sole load detection unit included in the walking training apparatus shown in FIG. 1.
Figure 8:
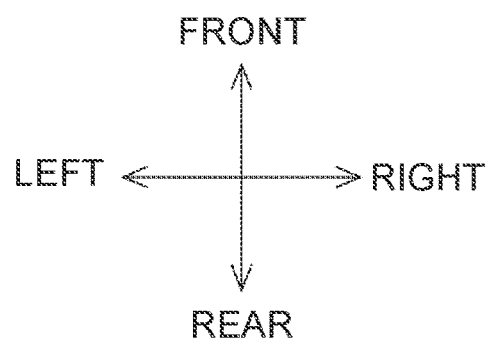

FIG. 8 is a schematic plan view showing another example of the foot sole load detection unit 224 used for detecting the gait state of the trainee 900.

In the example of FIG. 8, a load distribution sensor 226 constituted of two load sensors 226a, 226b is used as the foot sole load detection unit 224. For example, the load sensors 226a, 226b are installed inside the belt 1311 of the treadmill 131 (under the surface of the belt 1311 where the trainee 900 is aboard) so as not to interlock with the belt 1311.

The load sensors 226a, 226b are formed into a rectangle shape and are provided respectively on the left side and the right side of a boundary line BL that passes through the center of the load detection area and extends along an advancing direction of the trainee 900 (in other words, the moving direction of the belt 1311).

The load sensors 226a, 226b each include a rectangular boarding plate and load cells arranged at four corners of the boarding plate to support the boarding plate. The boarding plate is formed with a rectangular plate having relatively high rigidity that is high enough for the trainee 900 to board, the plate being made of polycarbonate resin, for example.

Here, the load of the foot sole detected by the load sensor 226a provided on the left side of the boundary line BL can be determined to be the load received from the foot sole of the left leg of the trainee 900, and the load of the foot sole detected by the load sensor 226b provided on the right side of the boundary line BL can be determined to be the load received from the foot sole of the right leg of the trainee 900.

Accordingly, based on the load of the foot sole of the left leg detected by the load sensor 226a and the load of the foot sole of the right leg detected by the load sensor 226b, the skeletal information specification unit 210d specifies the respective pieces of skeletal information on the right leg and the left leg included in the skeletal information on the trainee 900 in the sagittal plane acquired by the skeletal information acquisition unit 210c.

In the example of FIG. 8, the center of the load of the foot sole FL of the left leg detected by the load sensor 226a is located ahead of the trainee 900 in the advancing direction, and the center of the load of the foot sole FR of the right leg detected by the load sensor 226b is located behind the trainee 900 in the advancing direction. Accordingly, the skeletal information specification unit 210d can specify, out of the skeletal information shown in FIG. 6 for example, the skeletal information on a leg part located ahead (on the right side of the page) as the skeletal information on the left leg, and specify the skeletal information on a leg part located behind (on the left side of the page) as the skeletal information on the right leg. The gait state detection unit 210e detects the gait state of the trainee 900 with use of the skeletal information in which the right leg and the left leg are specified. As a result, the accuracy of detecting the gait state of the trainee 900 is enhanced.

Another Example of Detection Method of Gait State of Trainee 900

Figure 9:
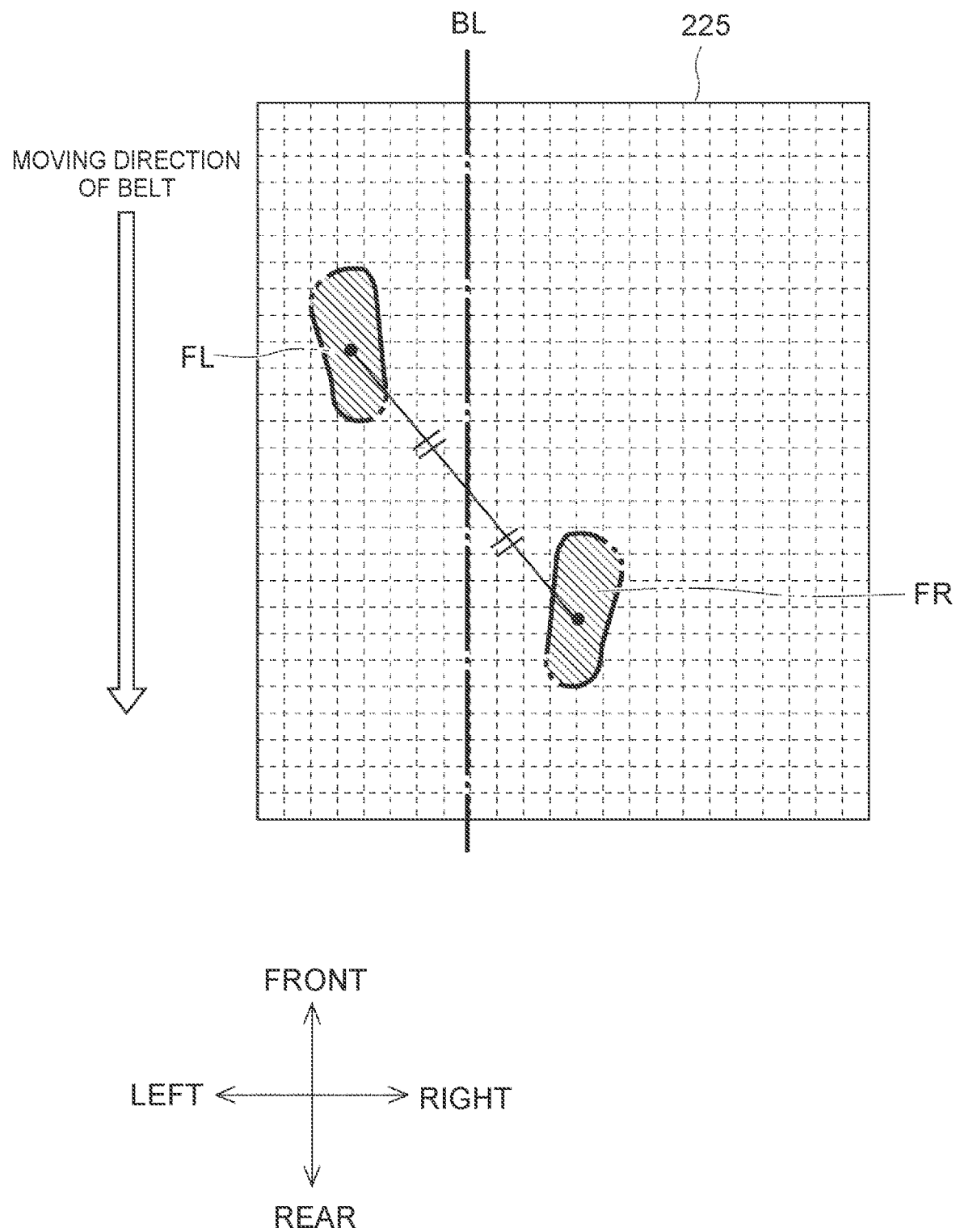
FIG. 9 is a schematic plan view showing another example of the foot sole load detection unit included in the walking training apparatus shown in FIG. 1.

FIG. 9 is a schematic plan view showing another example of the foot sole load detection unit 224 used for detecting the gait state of the trainee 900.

In the example of FIG. 9, the load distribution sensor 225 is used as the foot sole load detection unit 224 as in the case of FIG. 7.

Here, the load distribution sensor 225 has a boundary line BL defined to pass through the center of a line segment that connects two foot soles of the trainee 900 detected continuously by the load distribution sensor 225 and extend along the advancing direction of the trainee 900 (in other words, the moving direction of the belt 1311). The boundary line BL changes whenever the positions of the two foot soles detected continuously by the load distribution sensor 225 change as the trainee 900 walks. The load of the foot sole, detected in the area that is on the left side of the boundary line BL in the load detection area of the load distribution sensor 225, can be determined to be the load received from the foot sole of the left leg of the trainee 900, and the load detected in the area that is on the right side of the boundary line BL can be determined to be the load received from the foot sole of the right leg of the trainee 900.

Hence, based on the position of a foot sole FL detected as the foot sole of the left leg in the area on the left side of the boundary line BL and the position of a foot sole FR detected as the foot sole of the right leg in the area on the right side of the boundary line BL in the load detection area of the load distribution sensor 225, the skeletal information specification unit 210d specifies the respective pieces of skeletal information on the right leg and the left leg included in the skeletal information on the trainee 900 in the sagittal plane acquired by the skeletal information acquisition unit 210c.

In the example of FIG. 9, the foot sole FL, detected as the foot sole of the left leg in the area on the left side of the boundary line BL in the load detection area of the load distribution sensor 225, is located ahead of the trainee 900 in the advancing direction, and the foot sole FR detected as the foot sole of the right leg in the area on the right side of the boundary line BL is located behind the trainee 900 in the advancing direction. Accordingly, the skeletal information specification unit 210d can specify, out of the skeletal information shown in FIG. 6, for example, the skeletal information on a leg part located ahead (on the right side of the page) as the skeletal information on the left leg, and specify the skeletal information on a leg part located behind (on the left side of the page) as the skeletal information on the right leg. The gait state detection unit 210e detects the gait state of the trainee 900 with use of the skeletal information in which the right leg and the left leg are specified. As a result, the accuracy of detecting the gait state of the trainee 900 is enhanced.

In the example of FIG. 9, the boundary line BL can flexibly be changed even when the walking position of the trainee 900 is shifted. This makes it possible to prevent the detection accuracy of the gait state of the trainee 900 from deteriorating.

In the present embodiment, the case where the foot sole load detection unit 224 is attached to the treadmill 131 has been described as an example. However, the disclosure is not limited to the case. The foot sole load detection unit 224 may be a set of load sensors attached to the respective foot soles of the right leg and the left leg of the trainee 900.

Another Example of Detection Method of Gait State of Trainee 900

FIG. 10 illustrates another example of the detection method of the gait state of the trainee by the walking training apparatus. As shown in FIG. 10, in addition to acquiring the skeletal information on the trainee 900 in the sagittal plane from the image photographed by the camera 140 that photographs the trainee 900 from the lateral side, the skeletal information acquisition unit 210c may acquire the skeletal information on the trainee 900 in a frontal plane from an image photographed by the camera 150 that photographs the trainee 900 from the front side (or the rear side).

The skeletal information specification unit 210d then specifies respective pieces of skeletal information on the right leg and the left leg included in the skeletal information on the trainee 900 in the sagittal plane acquired by the skeletal information acquisition unit 210c, based on the load received from the foot soles of the trainee 900 detected by the foot sole load detection unit 224 and the skeletal information on the trainee 900 in the frontal plane. Thus, the skeletal information specification unit 210d can more accurately specify the skeletal information on the right leg and the left leg included in the skeletal information on the trainee 900 in the sagittal plane.

Then, the gait state detection unit 210e detects the gait state of the trainee 900 with the skeletal information in which the right leg and the left leg are specified. As a result, the accuracy of detecting the gait state of the trainee 900 is further enhanced.

In the case of referring to the skeletal information on the trainee 900 in the frontal plane at the time of specifying the skeletal information on the respective right leg and the left leg included in the skeletal information, the foot sole load detection unit 224 may take any configuration including the specific configuration examples described above.

Thus, the walking training apparatus 100 in the present embodiment specifies the skeletal information corresponding to the right leg and the left leg of the trainee 900, out of the skeletal information on the trainee 900 in the sagittal plane acquired by the skeletal information acquisition unit 210c, based on the load received from the foot soles of the trainee 900 detected by the foot sole load detection unit 224. As a result, the walking training apparatus 100 according to the present embodiment can enhance the detection accuracy of the gait state of the trainee 900 detected based on the skeletal information of the trainee 900. In other words, the walking training apparatus 100 in the present embodiment can acquire accurate gait information on the trainee. As a result, the trainee can conduct effective walking training.

In each of the above embodiments, the case where the trainee 900 is a hemiplegic patient with paralysis on one leg has been described as an example. However, the disclosure is not limited to the case. The trainee 900 may be a patient with paralysis on both legs, for example. In that case, the trainee 900 conducts training with the walking assist device 120 mounted on both the legs. Alternatively, the trainee 900 may not wear the walking assist device 120 on any of the legs.

Furthermore, the present disclosure can implement some or all of the processing in the walking training apparatus 100 by causing a central processing unit (CPU) to execute a computer program.

When the program is read into the computer, the program may include a group of commands (or software codes) for causing the computer to perform one or more functions described in the embodiment. The program may be stored in a non-transitory computer-readable medium or a tangible storage medium. The computer-readable medium or tangible storage medium includes, by way of example and not limitation, random-access memory (RAM), read-only memory (ROM), flash memory, solid-state drive (SSD) or other memory technology, CD-ROM, digital versatile discs (DVD), Blu-ray (registered trademark) discs or other optical disc storage, magnetic cassettes, magnetic tapes, magnetic disk storage, or other magnetic storage devices. The program may be transmitted on the transitory computer-readable medium or a communication medium. The transitory computer-readable medium or the communication medium includes, by way of example and not limitation, electrical, optical, acoustic, or other forms of propagation signals.

What is claimed is:

1. A walking training system, comprising:
   a treadmill;
   a load distribution sensor that is installed under a belt of the treadmill so as not to be interlocked with the belt and configured to detect distribution of load received from foot soles of a trainee aboard the belt of the treadmill;
   a first camera configured to photograph the trainee from a lateral side of the trainee;
   a second camera configured to photograph the trainee from a front side or a rear side of the trainee; and
   a processor configured to
   acquire first skeletal information that is skeletal information on the trainee in a sagittal plane from an image photographed by the first camera;
   acquire second skeletal information that is skeletal information on the trainee in a frontal plane from an image photographed by the second camara;
   specify each of a right leg and a left leg in a skeleton of a leg included in the first skeletal information, based on positions of the foot soles of the trainee detected by the load distribution sensor and the second skeletal information; and
   detect a position of one of the foot soles in contact with the treadmill by extracting an image area in a vicinity of a tip of the foot soles, and analyzing an identification marker drawn on a position of the belt that overlaps the tip of the foot soles.

2. The walking training system according to claim 1, wherein the processor is further configured to determine whether the foot soles of the trainee detected by the load distribution sensor correspond to the right leg or the left leg based on positions of the foot soles of the trainee detected by the load distribution sensor with a boundary line extending along an advancing direction of the trainee as a reference.

3. The walking training system according to claim 2, wherein the load distribution sensor includes a first load sensor installed in a right area of the boundary line, and a second load sensor installed in a left area of the boundary line.

4. The walking training system according to claim 1, wherein the processor is further configured to determine whether one of the foot soles of the trainee to be detected next by the load distribution sensor corresponds to the right leg or the left leg, based on a position of the one of the foot soles of the trainee to be detected next by the load distribution sensor with a boundary line as a reference, the boundary line passing through a center of a line segment that connects two foot sole positions of the trainee detected continuously by the load distribution sensor and extending along an advancing direction of the trainee.

5. The walking training system according to claim 1, wherein the load distribution sensor is a set of load sensors configured to be attached to respective foot soles of the right leg and the left leg of the trainee.

6. The walking training system according to claim 1, wherein the processor is further configured to detect a position of one of the foot soles in contact with the treadmill by analyzing the image photographed by the first camera or the second camera.

* * * * *